No. 629,525. Patented July 25, 1899.
J. J. SCHOLFIELD.
SPLIT HUB FOR WHEELS.
(Application filed June 12, 1899.)

(No Model.)

WITNESSES:
Harry J. Garceau.
Andrew J. Pitcher.

INVENTOR:
Joseph J. Scholfield
BY J. Scholfield
ATTY.

UNITED STATES PATENT OFFICE.

JOSEPH J. SCHOLFIELD, OF PROVIDENCE, RHODE ISLAND.

SPLIT HUB FOR WHEELS.

SPECIFICATION forming part of Letters Patent No. 629,525, dated July 25, 1899.

Application filed June 12, 1899. Serial No. 720,315. (No model.)

*To all whom it may concern:*

Be it known that I, JOSEPH J. SCHOLFIELD, a citizen of the United States, residing at Providence, in the State of Rhode Island, have invented a new and useful Improvement in Split Hubs for Wheels Made in Separable Parts, of which the following is a specification.

My invention consists in a split hub having a peripheral screw-thread and formed of three or more separate segments provided with integral lugs and opposite recesses, which by reason of their dissimilar arrangement serve to prevent the misplacement of the segments relatively to each other and to keep the screw-threads in proper line.

Figure 1:
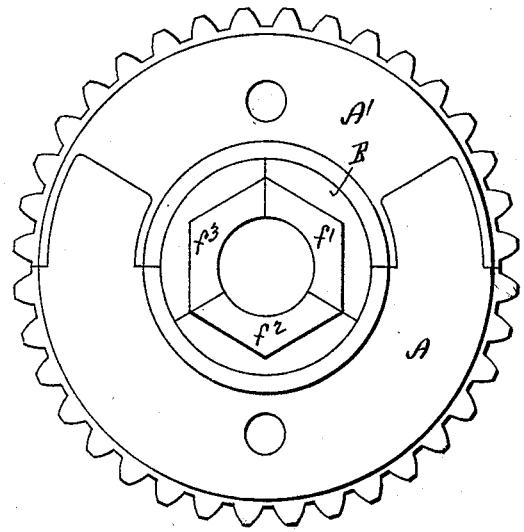
Figure 4:
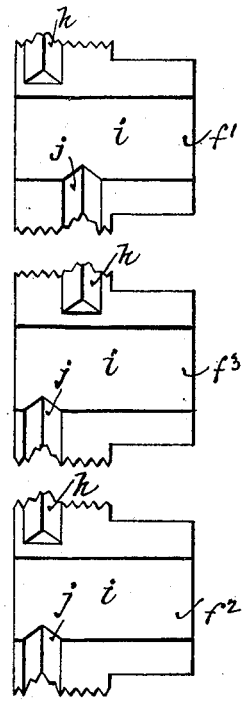
Figure 5:
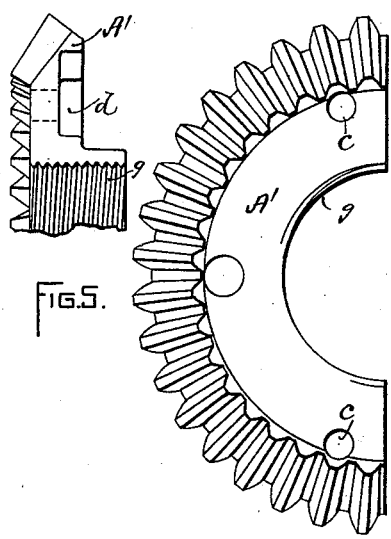
Figure 2:
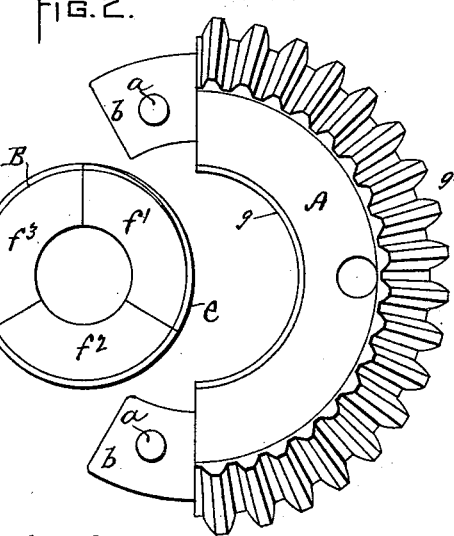
Figure 6:
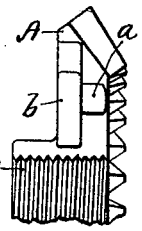
Figure 3:
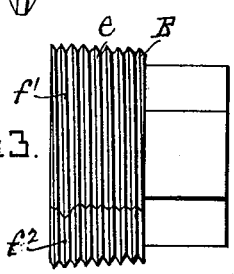

In the accompanying drawings, Figure 1 represents the back view of a gear-wheel formed of removable sections and provided with a split hub embodying my improvement. Fig. 2 represents a face view with the parts of the gear-wheel separated from the hub and showing an end view of the hub. Fig. 3 represents a side view of the hub. Fig. 4 represents an interior view of the several parts of the hub separated from each other. Fig. 5 represents a detail inner-edge view of one of the gear-segments. Fig. 6 represents a similar edge view of the opposite gear-segment.

In the drawings, A A' represent the opposite gear-segments, which are each provided with an internal thread $g$, which matches with the corresponding screw-thread of the opposite gear-segment, and are connected to each other by means of the studs $a\ a$ upon the projecting tongues $b\ b$ of the gear-segment A, which studs are adapted to enter the perforations $c\ c$ in the segment A', suitable recesses $d$ being provided at the back of the segment A to receive the said tongues $b\ b$. The split hub B is made in three or more parts and provided with a peripheral tapering screw-thread $e$, as shown in Fig. 3, and when the three parts $f'\ f^2\ f^3$ of the hub are placed together and the connected gear-segments A A' screwed thereon, as shown in Fig. 1, the several segments of the hub B will be caused to close tightly upon the shaft.

In wheels of this character it is very desirable that some means be provided whereby the screw-threads of the several segments of the hub B may be readily placed in true line with each other and readily held in line preparatory to engagement with the internal screw-thread of the outer gear-segment, and with this end in view I provide the several segments of the hub with an integral projection $h$ at one side of the cylindrical groove $i$ and a recess or notch $j$ upon the opposite side, the said projections and notches or recesses being arranged dissimilarly in the several segments of the hub, as shown in Fig. 4, so that they will fit together only when the several segments are properly arranged, as shown in Fig. 3.

I do not claim a wheel-hub formed of several similar and equal separable segments having a peripheral screw-thread; but

I claim as my invention—

A wheel-hub, formed of several segments, provided peripherally with a screw-thread, and interiorly with integral projections, and notches, arranged dissimilarly, whereby the several sections can only be placed together when the screw-threads are in proper alinement, substantially as described.

JOSEPH J. SCHOLFIELD.

Witnesses:
SOCRATES SCHOLFIELD,
HARRY J. GARCEAU.